[12] United States Patent
Lim

(10) Patent No.: US 7,119,783 B2
(45) Date of Patent: Oct. 10, 2006

(54) LIQUID CRYSTAL DISPLAY AND DRIVING METHOD THEREOF

(75) Inventor: Byoung Ho Lim, Gumu-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 74 days.

(21) Appl. No.: 10/948,291

(22) Filed: Sep. 24, 2004

(65) Prior Publication Data

US 2005/0035936 A1    Feb. 17, 2005

Related U.S. Application Data

(62) Division of application No. 10/017,583, filed on Dec. 18, 2001, now Pat. No. 6,812,908.

(30) Foreign Application Priority Data

Dec. 27, 2000    (KR) ............................... 2000-83095

(51) Int. Cl.
*G09G 3/36* (2006.01)
*G02F 1/1345* (2006.01)

(52) U.S. Cl. ........................ 345/100; 345/87; 345/92; 345/98; 349/143; 349/149

(58) Field of Classification Search .......... 345/87–100; 349/40, 139–149
See application file for complete search history.

(56) References Cited

U.S. PATENT DOCUMENTS

| | | | |
|---|---|---|---|
| 5,285,301 A | 2/1994 | Shirahashi et al. | 349/143 |
| 5,513,028 A | 4/1996 | Sono et al. | 349/139 |
| 5,719,648 A | 2/1998 | Yoshii et al. | 349/42 |
| 5,867,139 A * | 2/1999 | Tanaka et al. | 345/92 |
| 5,940,059 A * | 8/1999 | Lee et al. | 345/91 |
| 5,946,068 A * | 8/1999 | Lee et al. | 345/96 |
| 6,166,713 A | 12/2000 | Asai et al. | 345/92 |
| 6,333,771 B1 | 12/2001 | Matoba et al. | 349/192 |
| 6,384,878 B1 * | 5/2002 | Kwak | 349/40 |
| 6,512,505 B1 | 1/2003 | Uchino et al. | 345/87 |
| 6,587,160 B1 * | 7/2003 | Lee et al. | 349/40 |
| 2002/0109652 A1 * | 8/2002 | Lim et al. | 345/87 |
| 2002/0135544 A1 | 9/2002 | Myung | 345/60 |

FOREIGN PATENT DOCUMENTS

| | | |
|---|---|---|
| JP | 11-249127 | 9/1999 |
| JP | 2000-292804 | 10/2000 |

* cited by examiner

*Primary Examiner*—Bipin Shalwala
*Assistant Examiner*—David L. Lewis
(74) *Attorney, Agent, or Firm*—McKenna Long & Aldridge LLP

(57) ABSTRACT

A liquid crystal display includes m valid gate lines G1 to Gm arranged in a first direction with first constant intervals between gate lines, n valid data lines arranged in a second direction perpendicular to the valid gate lines with second constant intervals between data lines, and at least one dummy data line at a periphery of and in parallel with the n valid data lines. A method of driving a liquid crystal display is carried out by a general procedure of shorting the dummy data lines with a specific data line or by applying the same driving signals of a specific data line to the dummy data line.

28 Claims, 7 Drawing Sheets

Visible light

LIQUID CRYSTAL DISPLAY AND DRIVING METHOD THEREOF

CROSS-REFERENCE TO RELATED APPLICATIONS

This application is a divisional application of U.S. patent application Ser. No.: 10/017,583 filed Dec. 18, 2001, now U.S. Pat. No. 6,812,908; which claims priority to Korean Patent Application No.: P2002-83095, filed Dec. 27, 2000, the entirety of which each is hereby incorporated by reference for all purposes as if fully set forth herein.

BACKGROUND OF THE INVENTION

1. Field of the Invention

The present invention relates to a displaying apparatus, and more particularly to a liquid crystal display and driving method thereof.

2. Background of the Related Art

Generally, a liquid crystal display (LCD) includes a thin film transistor (TFT) liquid crystal display (TFT-LCD) panel, a backlight unit, and a driver. The TFT-LCD panel may have degradations as follows: first, degradation of characteristic values from standard design due to process deviations; second, degradation due to dust, poor cleaning at a film surface, and the like; and, third, degradation of characteristic variations due to static electricity and breakdown of thin film transistors or liquid crystal cells.

One of the degradations occurring in a TFT-LCD panel is the irregularity of combining a first substrate with an opposed second substrate, which results in reducing the sharpness of a displayed video or in leaking light when failing to meet the design margin.

Reference will now be made in detail to an LCD according to a related art, examples of which are illustrated in the accompanying drawings.

FIG. 1 shows a layout of an LCD according to a related art.

Referring to FIG. 1, a liquid crystal display generally comprises a number of 'm' gate lines G1 to Gm arranged in a first direction with a constant interval between the gate lines; a number of 'n' data lines D1 to Dn arranged in a second direction perpendicular to the respective gate lines G1 to Gm with a constant interval between the data lines; a plurality of pixel electrodes (not shown in the drawing) formed as a matrix in pixel areas defined by the crossing gate and data lines respectively; and a plurality of thin film transistors for applying data signals supplied through the respective data lines to the respective pixel electrodes by being switched according to signals of the gate lines.

Further, a pair of driver integrated circuits (ICs) 14 and 15 are installed at the sides of the gate and data lines, respectively, so as to supply gate and data driving signals thereto. Namely, a pair of pads (not shown in the drawing) are formed at the ends of the gate and data lines to which the driver ICs are connected.

FIG. 2 shows cross-sectional views of the LCD taken along a line I–I' in FIG. 1.

Referring to FIG. 2, a gate insulating layer 22 is formed on a first substrate 21. An nth data line 23 is patterned on the gate insulating layer 22. A passivation layer 24 made of an insulator is formed over an entire surface of the substrate including the nth data line 23. A transparent conductive layer of indium tin oxide (ITO) 25 for applying a voltage to the liquid crystal display is patterned on the passivation layer 24.

A black matrix 27 having predetermined spaces therein, is formed on an upper insulating substrate 26. A color filter layer 28 fills the spaces in the black matrix 27.

Unfortunately, the LCD according to the related art has some problems as follows.

The degree of alignment for the TFT and color filter substrates depends on the alignment tolerance (or margin) for combining (or assembling) the upper and lower substrates. Such combining margin is determined by the design of the respective substrates, for which precision of about several micrometers is required. Light leakage occurs at both lateral sides of the panel when the alignment between two substrates is deviated from the combining margin, thereby failing to provide desirable driving characteristics.

Namely, as shown in FIG. 2, there is no structure to block the light leakage at the right side of the nth data line 23. Therefore, light leakage occurs due to the transmitting light reaching the color filter layer.

SUMMARY OF THE INVENTION

Accordingly, the present invention is directed to a liquid crystal display and driving method thereof that substantially obviates one or more of the problems due to limitations and disadvantages of the related art.

An advantage of the present invention is to provide the provision of a liquid crystal display and driving method thereof, in which additional dummy gate and data lines are formed to prevent light leakage at both lateral sides of the panel due to the combining irregularity of the panels.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages, and in accordance with the purpose of the present invention as embodied and broadly described, a liquid crystal display according to the present invention includes m valid gate lines G1 to Gm arranged in a first direction with first constant intervals between the valid gate lines; n valid data lines arranged in a second direction perpendicular to the valid gate lines with second constant intervals between the valid data lines; and at least one dummy data line at a periphery of and in parallel with the n valid data lines.

In another aspect of the present invention, a liquid crystal display according to the present invention includes m valid gate lines G1 to Gm arranged in a first direction with first constant intervals between the valid gate lines; n valid data lines arranged in a second direction perpendicular to the valid gate lines with second constant intervals between the valid data lines; a dummy gate line in parallel with the valid gate lines at a periphery of the m valid gate lines; and at least a first and a second dummy data line at left and right sides of the n valid data lines.

In a further aspect of the present invention, a liquid crystal display in a TFT-LCD panel includes a first substrate on which a black matrix layer and a color filter layer are stacked sequentially on a first insulating substrate; a second substrate on which a gate electrode, a gate insulating layer, an active semiconductor layer, source and drain electrodes, and a passivation layer are stacked on a second insulating substrate, wherein the second substrate opposes the first substrate; and a liquid crystal layer between the first and second substrates, wherein the passivation layer is formed of an organic insulating material.

In another further aspect of the present invention, a method of driving a liquid crystal display including a valid data line area in which a plurality of data lines D1 to Dn are formed; areas of a first dummy data line and a second dummy data line formed at left and right sides of the valid data line area; a valid gate line area in which a plurality of gate lines G1 to Gm are formed; and a first dummy gate line formed at one side of the valid gate line area, includes applying a first same driving signal to the first dummy data line and a second data line D2 in a plurality of the data lines and a second same driving signal to the second dummy data line and (n−1)th data line Dn−1, and applying a pulse waveform synchronized to a waveform applied to the mth gate line Gm to the dummy data lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
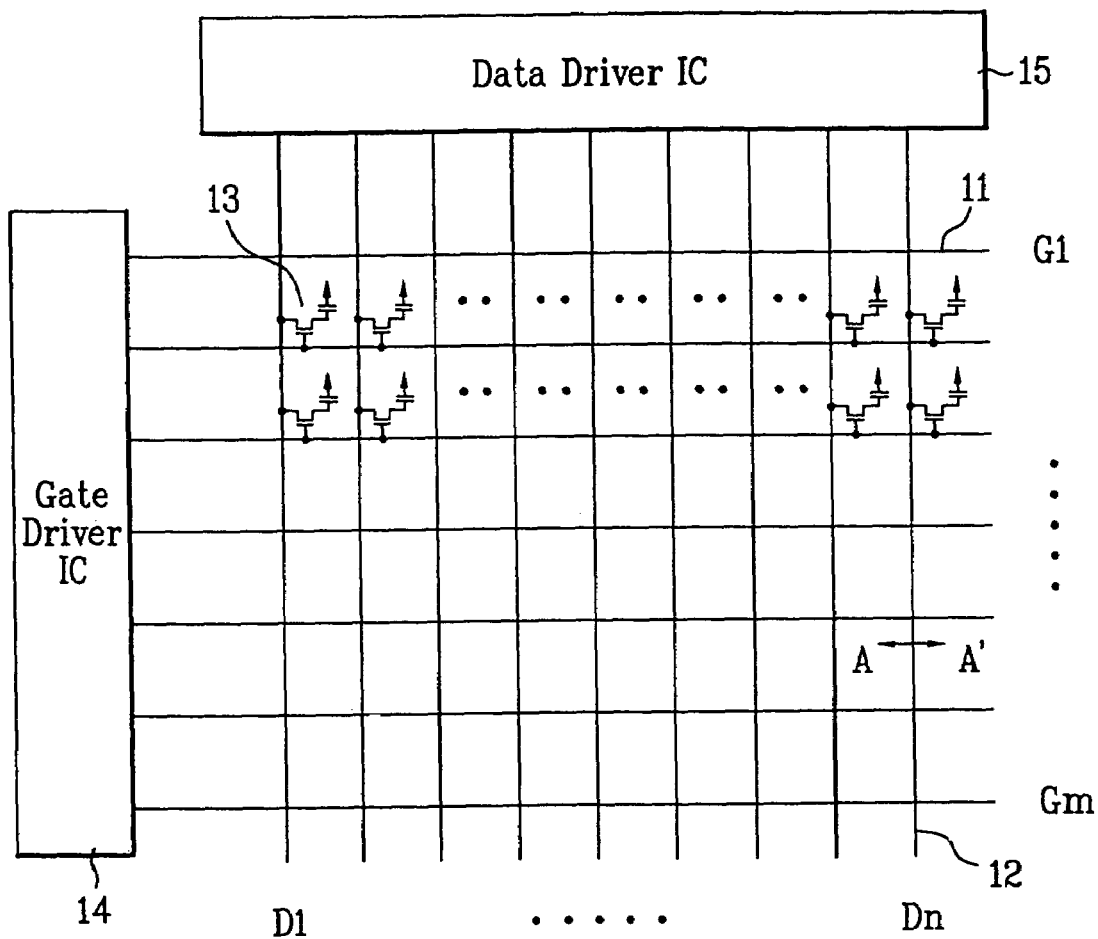
FIG. 1 shows a layout of LCD according to a related art.
Figure 2:
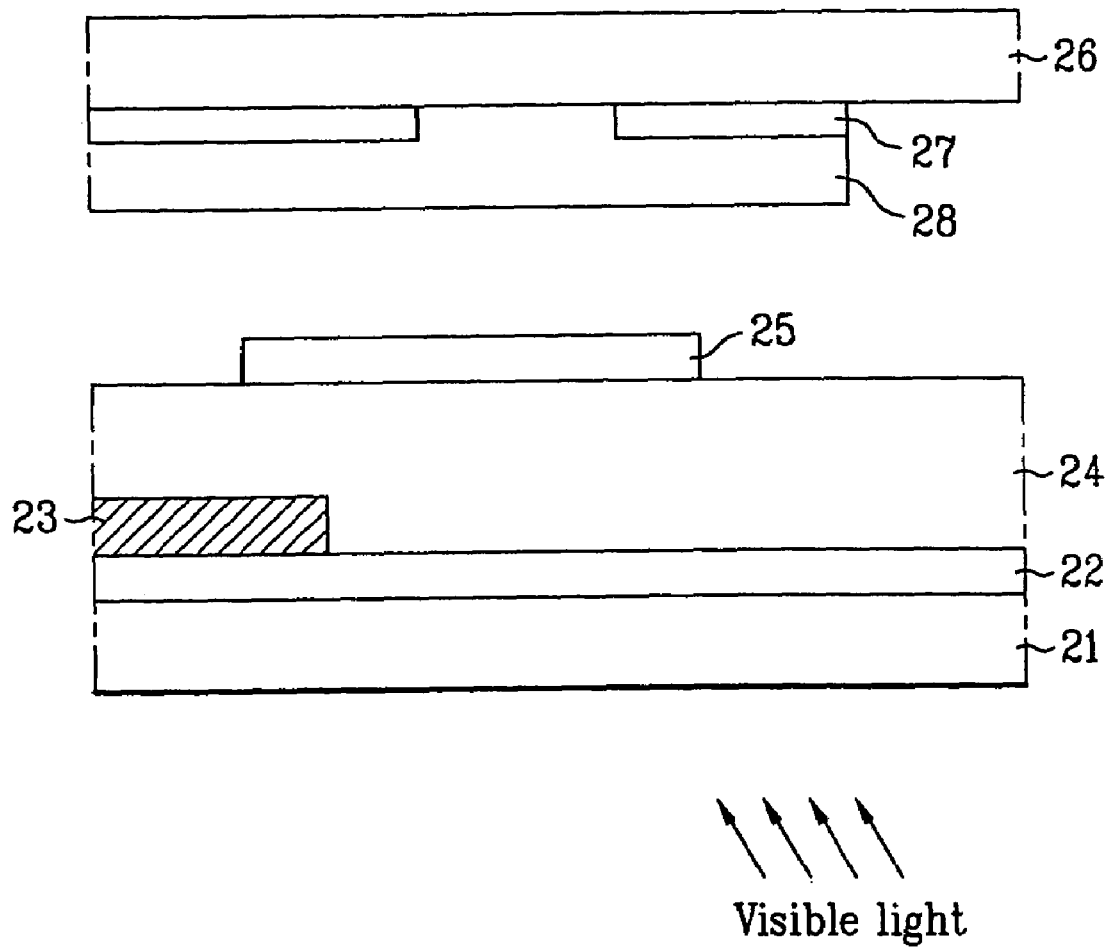
FIG. 2 shows a cross-sectional view of the LCD taken along a line I–I' in FIG. 1.

Reference will now be made in detail to embodiments of the present invention, examples of which are illustrated in the accompanying drawings. Where possible, the same reference numerals will be used to illustrate like elements throughout the specification.

In the present invention, it is intended that forming additional dummy gate and data lines prevents light leakage at both lateral sides of the panel due to the combining irregularity of the panels.

Figure 3:
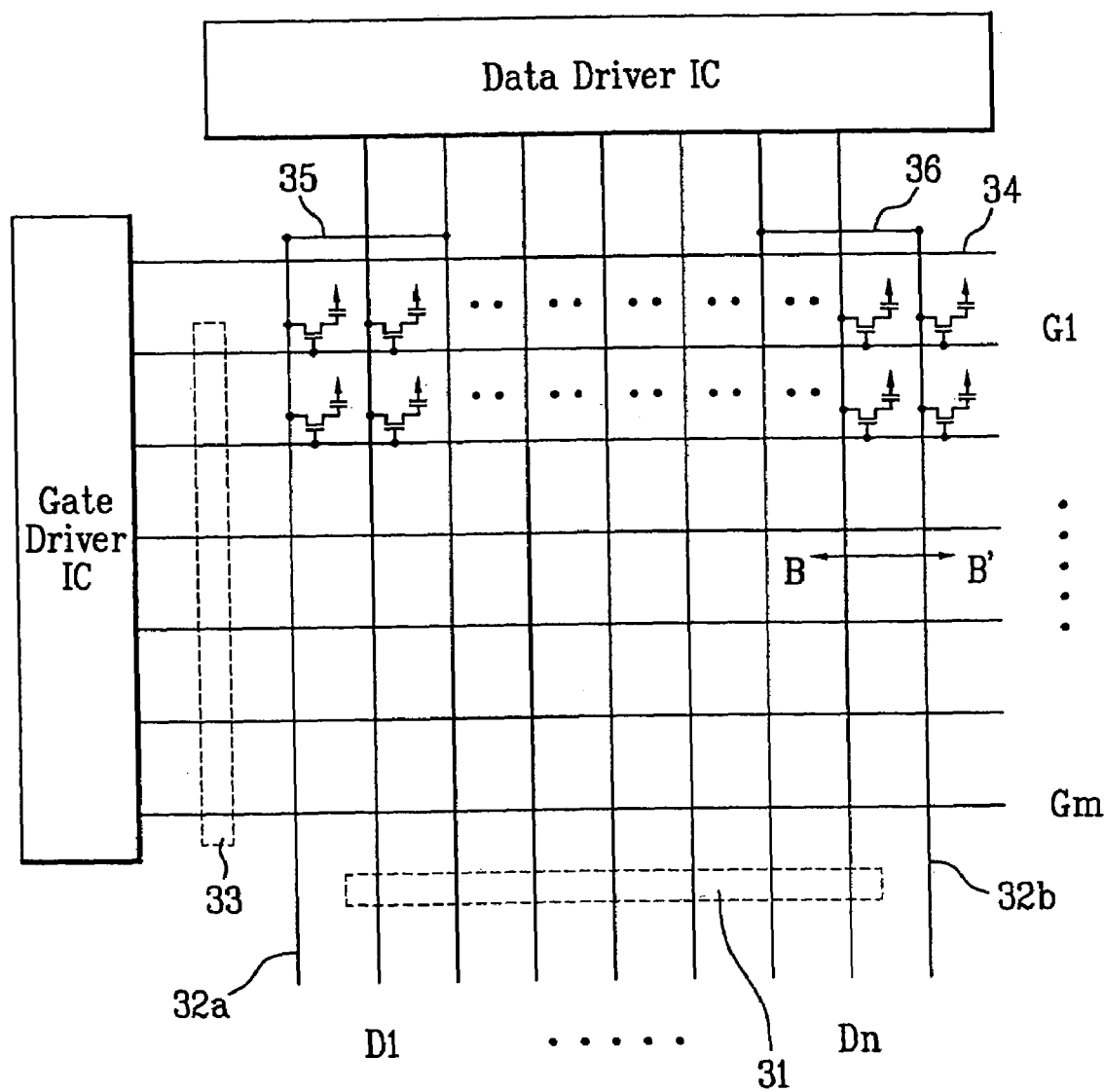
FIG. 3 shows a layout of a liquid crystal display according to a first embodiment of the present invention.

FIG. 3 shows a layout of a liquid crystal display according to a first embodiment of the present invention.

Referring to FIG. 3, a panel according to the present invention includes a valid data line area 31 in which a plurality of even-numbered and odd-numbered data lines D1' to Dn are separated from each other by a constant interval between data lines; a first dummy data line area 32a and a second dummy data line area 32b formed outside the valid data line area 31; a valid gate line area 33 where a plurality of gate lines G1 to Gm are formed in a direction crossing with the data lines with constant intervals between adjacent gate lines; and a first dummy gate line area 34 outside the valid gate line area 33.

In this case, the first dummy data line formed in the first dummy data line area 32a is connected with the second data line D2 in the valid data line area 31 through a first conductive line 35. The second dummy data line formed in the second dummy data line area 32b is connected with the (n−1)th data line Dn−1 in the valid data line area 31 through a second conductive line 36.

Therefore, the first dummy data line formed in the first dummy data line area 32a is supplied with the same data signal as applied to the second data line D2, while the second dummy data line in the second dummy data line area 32b is supplied with the same data signal as applied to the (n−1)th data line Dn−1.

The LCD according to the present invention is driven by the data inversion method. Thus, the first data line D1 is positive (+) and the second data line D2 is negative (−), thereby resulting in the alternation of (+) and (−) in a plurality of the data lines formed in the valid data line area 31.

Accordingly, the first dummy data line in the first dummy data line area 32a is driven in a manner opposite to that of the first data line D1, while the second dummy data line in the second dummy data line area 32b is driven in a manner opposite to that of the nth data line Dn.

The LCD having the above structure is driven in a manner as follows.

First, as shown in FIG. 3, the first dummy data line is connected to the second data line D2 through the first conductive line 35, and the second dummy data line is connected to the (n−1)th data line Dn−1 through the second conductive line 36. In this case, data signals are outputted from the driver by a general method.

Therefore, the effective width of the display is broadened by driving all the pixels of the display because the data lines including the first and second dummy data lines are driven in accordance with the alternating of (+) and (−).

Figure 4:
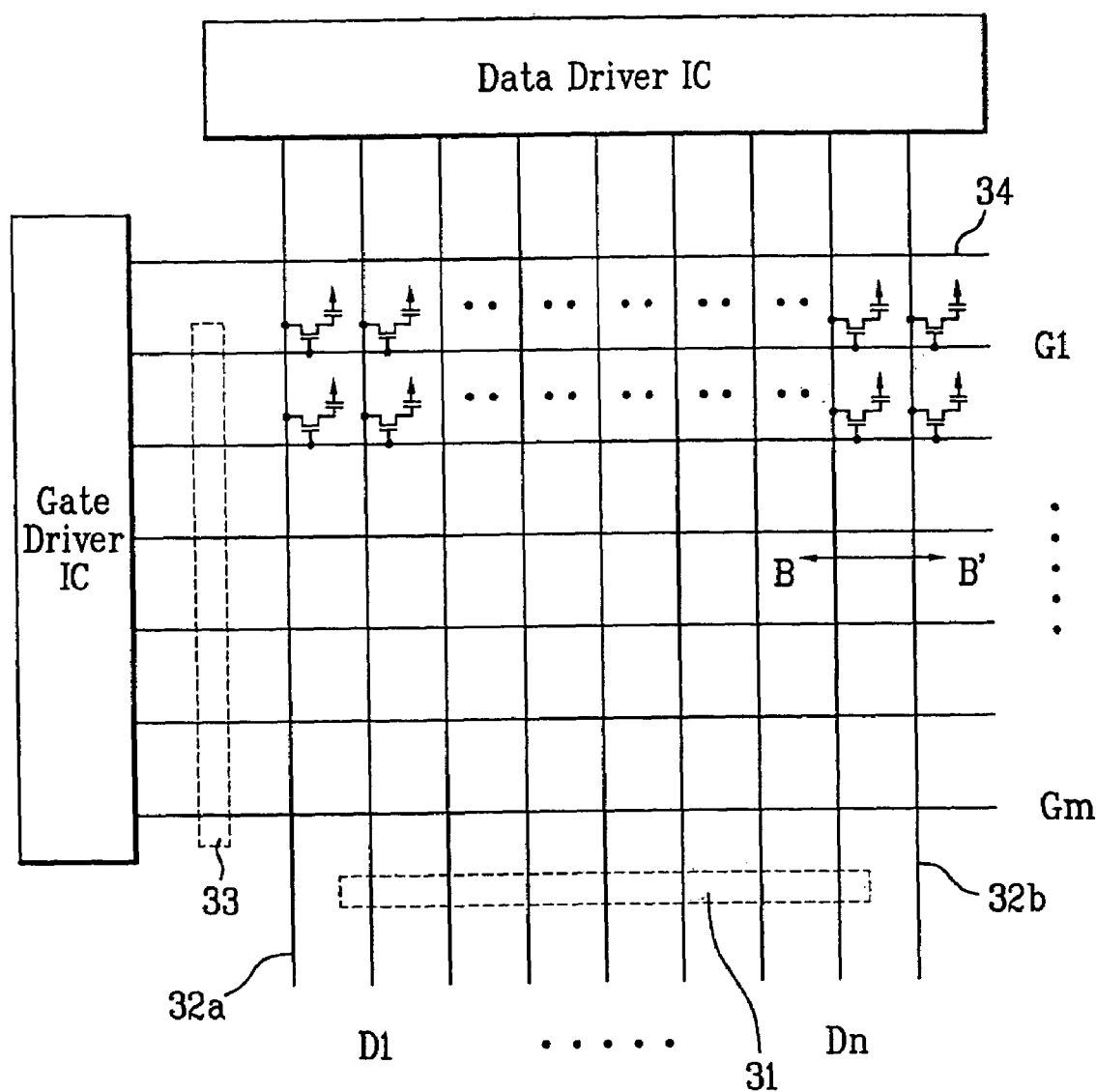
FIG. 4 shows a layout of a liquid crystal display according to a second embodiment of the present invention.

FIG. 4 shows a layout of a liquid crystal display according to a second embodiment of the present invention.

Referring to FIG. 4, the structure of a panel in an LCD according to the second embodiment is the same as that of the panel of the first embodiment, except for the formation of the first and second conductive lines. In such a structure, a data driver circuit supplies video signals so that one signal is applied to the first dummy data line and the second data line D2, and another signal is applied to the second dummy data line and the (n−1)th data line. The first dummy data line and the second dummy data line are supplied with video signals having different polarities respectively. The data driver applies the same video signals to the second data line D2 and the first dummy data line and applies another identical video signal to the (n−1)th data line n−1 and the second dummy data line. A voltage difference between high and low levels, $\Delta V_{gh1}$ ($=V_{gh}-V_{gl}$), applied to the first dummy gate line is equal to or higher than about 1V.

In this case, a gate driving signal for driving the first and second dummy data lines and the valid data line is explained in the following description.

Figure 5:
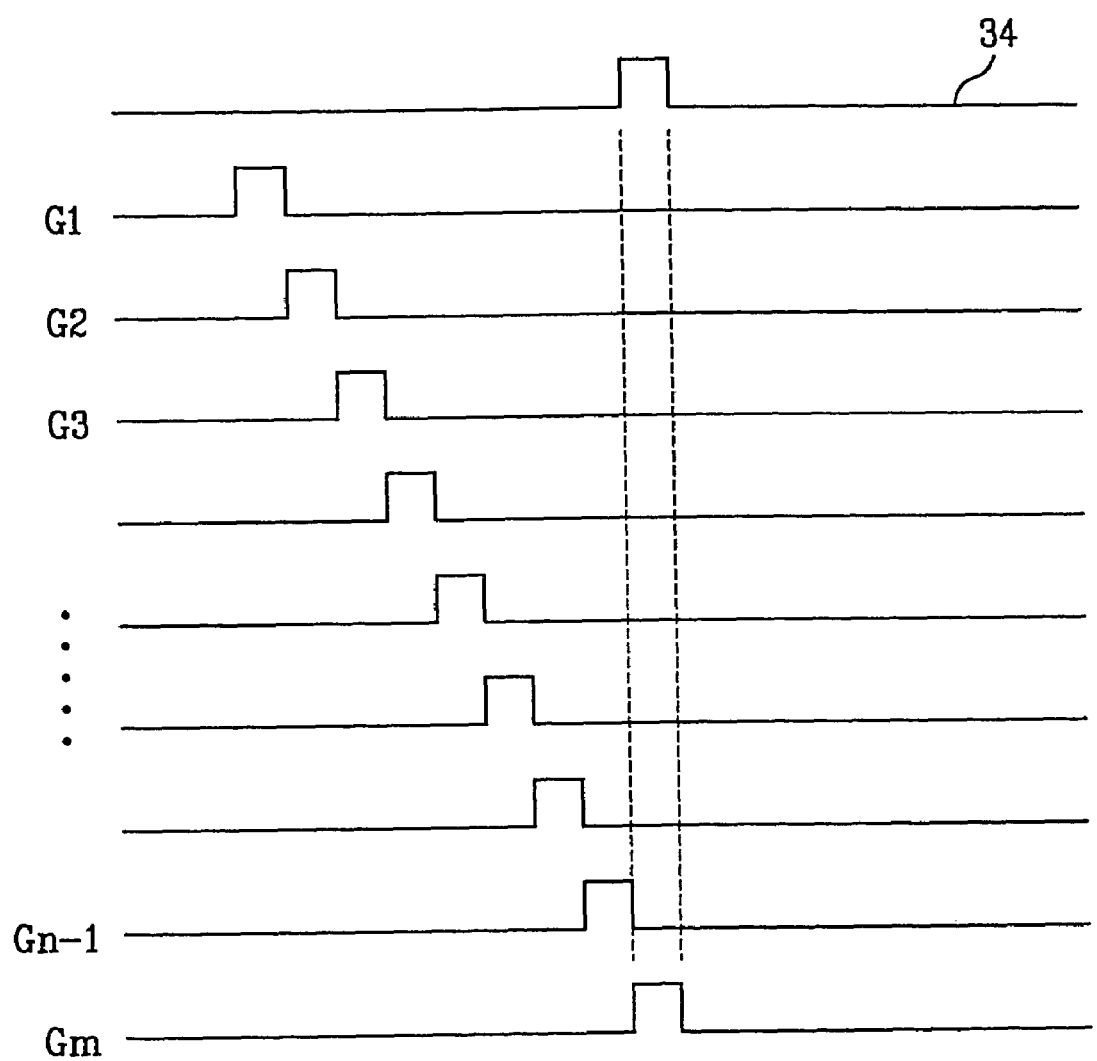
FIG. 5 shows a timing graph of gate driving signals in a liquid crystal display according to the present invention.

FIG. 5 shows a timing graph of gate driving signals in a liquid crystal display according to the present invention.

Referring to FIG. 5, the time at which a driving signal is applied to the first dummy gate line 34 is synchronized with the time at which a driving signal is applied to the mth gate line Gm placed at the end of the panel.

Namely in the panel, when the driving signal is finally applied to the mth gate line Gm through a plurality of valid gate lines G1 to Gm from the first dummy gate line 34, the same signal is applied to the first dummy gate line 34.

Figure 6A:
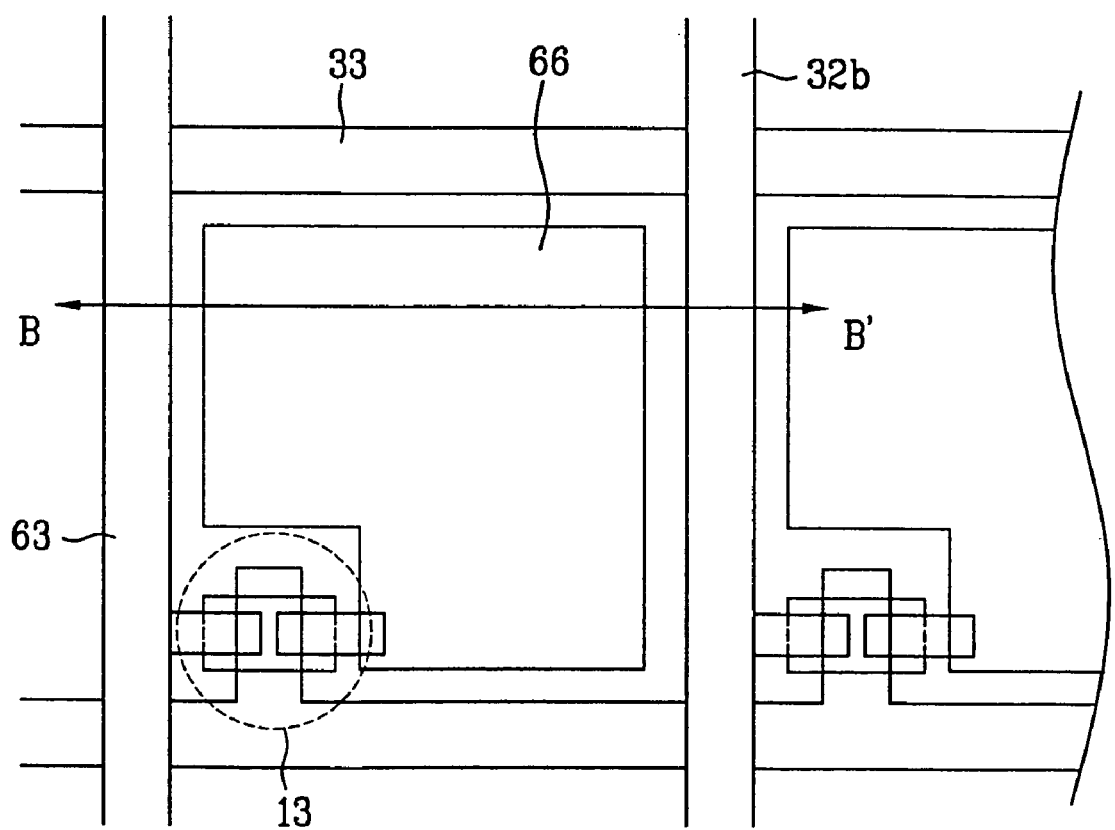
FIG. 6A shows a layout of a magnified area II–II' in FIG. 3.

FIG. 6A shows a layout of a magnified area II–II' in FIG. 3 and FIG. 4.

Referring to FIG. 6A, a pixel electrode 66 and a thin film transistor 13 are formed in a pixel area defined by an nth data line Dn 63, a second dummy data line 32b, and a pair of valid gate lines 33 crossing with the nth data line Dn and the second dummy data line 32b.

Figure 6B:
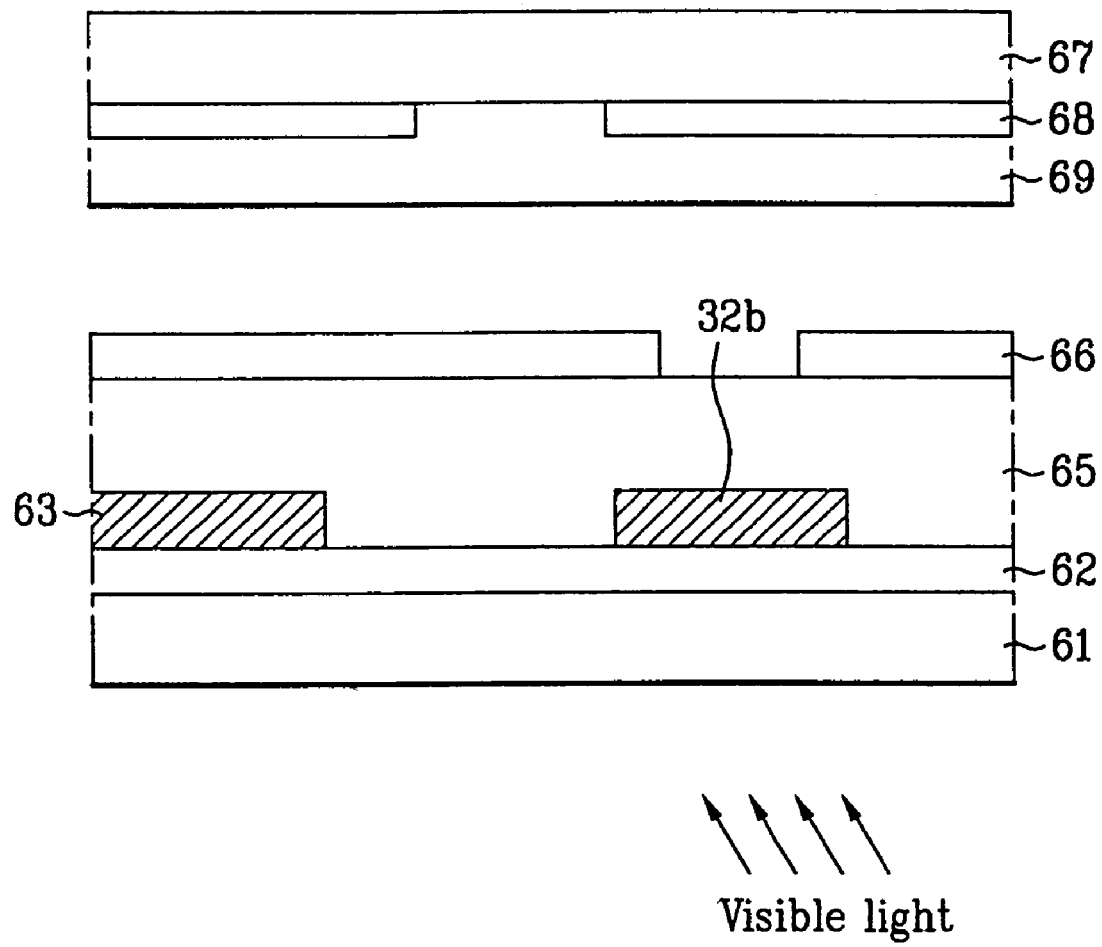
FIG. 6B shows a cross-sectional view the LCD taken along a line III–III' in FIG. 6A.

FIG. 6B shows a cross-sectional view the LCD taken along a line III–III' in FIG. 6A.

Referring to FIG. 6B, a gate insulating layer 62 is formed on an insulating substrate 61 as a lower substrate. The nth data line 63 and the second dummy data line 32b are formed on the gate insulating layer 62 a predetermined interval apart.

A passivation layer 65 is formed on the substrate including the data lines with an organic insulating material such as BCB (benzocyclobutene) or acrylate or an inorganic insulating material such as silicon nitride ($SiN_x$).

A transparent conductive layer 66 of ITO for applying voltage to the liquid crystal display is formed on the passivation layer 65.

A black matrix 68 having a space therein is patterned on the other insulating substrate 67 as an upper substrate. A color filter layer 69 is formed on the substrate 67 including the black matrix 68.

The second dummy data line 32b formed in the above structure prevents light transmission within a visible angle at the edge of the panel and drives the pixel at the lateral sides of the second dummy data line, which also occurs in an area where the first dummy data line is formed.

Accordingly, the LCD according to the present invention prevents light leakage due to the combining irregularity by adding the dummy data lines and dummy gate lines, as well as substantially widening the display by driving the pixels next to the dummy data line when applying signals to the dummy data line.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display in a TFT-LCD panel, comprising:
   a first substrate in which a black matrix layer and a color filter layer are stacked sequentially on a first insulating substrate;
   a second substrate on which a gate electrode, a gate insulating layer, at least one valid data line and at least one dummy data line adjacent the at least one valid data line, an active semiconductor layer, source and drain electrodes, and a passivation layer are stacked on a second insulating substrate, wherein the second substrate opposes the first substrate; and
   a liquid crystal layer between the first and second substrates, wherein the at least one dummy data line prevents light transmission within a visible angle at an edge of the TFT-LCD panel.

2. The liquid crystal display of claim 1, wherein the passivation layer is formed of an organic insulating material.

3. The liquid crystal display of claim 1, wherein the passivation layer is formed of an inorganic insulating material.

4. The liquid crystal display of claim 3, wherein the inorganic insulating material is silicon nitride ($SiN_x$).

5. The liquid crystal display of claim 2, wherein the organic insulating material is one of BCB (benzocyclobutene) and acrylate.

6. A method of driving a liquid crystal display, the liquid crystal display including a valid data line area in which a plurality of data lines D1 to Dn are formed, areas of a first dummy data line and a second dummy data line formed at left and right sides of the valid data line area, a valid gate line area in which a plurality of gate lines G1 to Gm are formed, and a first dummy gate line formed at one side of the valid gate line area, the method comprising:
   applying a first same driving signal to the first dummy data line and a second data line D2 and a second same driving signal to the second dummy data line and an (n−1)th data line Dn−1; and
   applying a pulse waveform synchronized to a waveform applied to the mth gate line Gm to the first dummy gate line.

7. The method of driving a liquid crystal display of claim 6, wherein an alternating signal that has one of positive (+) and negative (−) polarity is applied to each of a plurality of the data lines including the first and second dummy data lines.

8. The method of driving a liquid crystal display of claim 6, wherein the first and second dummy data lines are connected electrically to the second data line D2 and the (n−1)th data line, respectively.

9. The method of driving a liquid crystal display of claim 6, wherein a data driving circuit applies a first video signal to the first dummy data line and second data line and a second video signal to the second dummy data line and the (n−1)th data line.

10. The method of driving a liquid crystal display of claim 6, wherein the first and second dummy data lines are supplied with video signals having different polarities, respectively.

11. The method of driving a liquid crystal display of claim 6, wherein a pulse waveform synchronized to a waveform applied to the mth gate line Gm is applied to the dummy gate line.

12. The liquid crystal display of claim 6, wherein a voltage difference between high and low levels, $\Delta V_{ghl}$ ($=V_{gh}-V_{gl}$), applied to the first dummy gate line is equal to or higher than 1V.

13. A liquid crystal display, comprising:
   a gate insulating layer formed on a first insulating substrate;
   a plurality of data lines D1 through Dn, wherein a dummy data line and at least one of the first data line and the nth data line are formed on the gate insulating layer a predetermined interval apart;
   a passivation layer formed on the first insulating substrate including the data lines;
   a transparent conductive layer for applying voltage to the liquid crystal display formed on the passivation layer;
   a black matrix having a space therein patterned on a second insulating substrate; and
   a color filter formed on the second insulating substrate including the black matrix, wherein the dummy data line prevents light transmission within a visible angle at an edge of the liquid crystal display.

14. The liquid crystal display of claim 13, wherein the passivation layer is one of BCB (benzocyclobutene) and acrylate.

15. The liquid crystal display of claim 13, wherein the passivation layer is silicon nitride ($SiN_x$).

16. A method of driving a liquid crystal display, comprising:
applying the same driving signal to at least one dummy data line and a corresponding data line of a plurality of data lines D1 to Dn;
wherein the at least one dummy data line includes a first dummy data line and a second dummy data line; and
wherein the applying includes applying the same driving signal to the first dummy data line and a second data line D2 of the plurality of data lines D1 to Dn and applying the same driving signal to the second dummy data line and a (n−1)th data line Dn−1 of the plurality of data lines D1 to Dn.

17. The method of driving a liquid crystal display of claim 16, wherein an alternating driving signal having one of a positive (+) and a negative (−) polarity is applied to each of a plurality of the data lines including the at least one dummy data line.

18. The method of driving a liquid crystal display of claim 16, wherein the first and second dummy data lines are electrically connected to the second data line D2 and the (n−1)th data line, respectively.

19. The method of driving a liquid crystal display of claim 16, wherein the first dummy data line is arranged at a first side of the plurality of data lines D1 to Dn and the second dummy data line is arranged at a second side of the plurality of data lines D1 to Dn, opposite the first side.

20. The method of driving a liquid crystal display of claim 16, wherein driving signals having different polarities are applied to the first and second dummy data lines.

21. The method of driving a liquid crystal display of claim 16, further comprising applying a pulse waveform to an mth one of a plurality of gate lines G1 to Gm a dummy gate line in synchrony, wherein the dummy gate line is arranged at a first side of the plurality of gate lines G1 to Gm.

22. The method of driving a liquid crystal display of claim 21, wherein a voltage difference between high and low levels, $\Delta V_{ghl}$ ($=V_{gh}-V_{gl}$), applied to the dummy gate line is equal to or higher than 1V.

23. A method of driving a liquid crystal display, comprising:
applying a pulse waveform to an mth one of a plurality of gate lines G1 to Gm a dummy gate line in synchrony, wherein the dummy gate line is arranged at a first side of the plurality of gate lines G1 to Gm; and
applying the same driving signal to at least one dummy data line and a corresponding data line of a plurality of data lines D1 to Dn;
wherein the at least one dummy data line includes a first dummy data line and a second dummy data line; and
wherein the applying includes applying the same driving signal to the first dummy data line and a second data line D2 of the plurality of data lines D1 to Dn and applying the same driving signal to the second dummy data line and a (n−1)th data line Dn−1 of the plurality of data lines D1 to Dn.

24. The method of driving a liquid crystal display of claim 23, wherein a voltage difference between high and low levels, $\Delta V_{ghl}$ ($=V_{gh}-V_{gl}$), applied to the dummy gate line is equal to or higher than 1V.

25. The method of driving a liquid crystal display of claim 23, wherein an alternating driving signal having one of a positive (+) and a negative (−) polarity is applied to each of a plurality of the data lines including the at least one dummy data line.

26. The method of driving a liquid crystal display of claim 23, wherein the first and second dummy data lines are electrically connected to the second data line D2 and the (n−1)th data line, respectively.

27. The method of driving a liquid crystal display of claim 23, wherein the first dummy data line is arranged at a first side of the plurality of data lines D1 to Dn and the second dummy data line is arranged at a second side of the plurality of data lines D1 to Dn, opposite the first side.

28. The method of driving a liquid crystal display of claim 23, wherein driving signals having different polarities are applied to the first and second dummy data lines.

* * * * *